US012776856B2

(12) United States Patent
Kuo

(10) Patent No.: US 12,776,856 B2
(45) Date of Patent: Oct. 27, 2026

(54) SOFT TRELLIS DE-SHAPER FOR CONSTELLATION SHAPING

(71) Applicant: MEDIATEK INC., Hsinchu (TW)

(72) Inventor: Chun-Hsuan Kuo, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 13 days.

(21) Appl. No.: 18/517,169

(22) Filed: Nov. 22, 2023

(65) Prior Publication Data

US 2024/0178936 A1 May 30, 2024

Related U.S. Application Data

(60) Provisional application No. 63/384,960, filed on Nov. 24, 2022.

(51) Int. Cl.
*H04L 1/00* (2006.01)
*H04L 25/03* (2006.01)

(52) U.S. Cl.
CPC ............ *H04L 1/006* (2013.01); *H04L 1/0054* (2013.01); *H04L 25/03203* (2013.01)

(58) Field of Classification Search
CPC .. H04L 1/006; H04L 25/03203; H04L 1/0054
See application file for complete search history.

(56) References Cited

U.S. PATENT DOCUMENTS 9,825,650 B2* 11/2017 Sham .................... H04L 1/0052
2016/0128042 A1* 5/2016 Choi ................. H04W 72/0473 370/329
2016/0380725 A1* 12/2016 Lorca Hernando ... H04L 1/0057 714/776
2019/0334755 A1* 10/2019 Limberg ................. H04L 27/28
2020/0044770 A1* 2/2020 Lefevre ................. H04L 1/0041
2023/0033774 A1* 2/2023 Koike-Akino .......... H04L 27/36

OTHER PUBLICATIONS

Arafa, Design and Optimization of Combined Constellation Shaping and Bit LDPC Coded Modulation Using EXIT Chart (Year: 2012).*
Wakeel, Multi-Edge-Type LDPC Code Concatenated with Trellis Shaping for PAR Reduction (Year: 2016).*

* cited by examiner

*Primary Examiner* — Mark D Featherstone
*Assistant Examiner* — Jack Kensington Barnett
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a receiver. The receiver receives, from a transmitter, a signal carrying a constellation symbol. The receiver processes the received signal by a soft symbol demapper to generate a first soft output of a first set of bits and a second soft output of a second set of bits. The receiver processes the second soft output by a soft syndrome former to generate a third soft output of a third set of bits. The soft syndrome former corresponds to a shaping code applied at the transmitter. The receiver recovers bits represented by the constellation symbol based on the first soft output and the third soft output.

16 Claims, 13 Drawing Sheets

1100

SOFT TRELLIS DE-SHAPER FOR CONSTELLATION SHAPING

CROSS-REFERENCE TO RELATED APPLICATION(S)

This application claims the benefits of U.S. Provisional Application Ser. No. 63/384,960, entitled "APPROACHING SHANNON CAPACITY VIA CONSTELLATION SHAPING" and filed on Nov. 24, 2022, which is expressly incorporated by reference herein in its entirety.

BACKGROUND

Field

The present disclosure relates generally to communication systems, and more particularly, to techniques of implementing a soft Trellis de-shaper for constellation shaping.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a receiver. The receiver receives, from a transmitter, a signal carrying a constellation symbol. The receiver processes the received signal by a soft symbol demapper to generate a first soft output of a first set of bits and a second soft output of a second set of bits. The receiver processes the second soft output by a soft syndrome former to generate a third soft output of a third set of bits. The soft syndrome former corresponds to a shaping code applied at the transmitter. The receiver recovers bits represented by the constellation symbol based on the first soft output and the third soft output.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
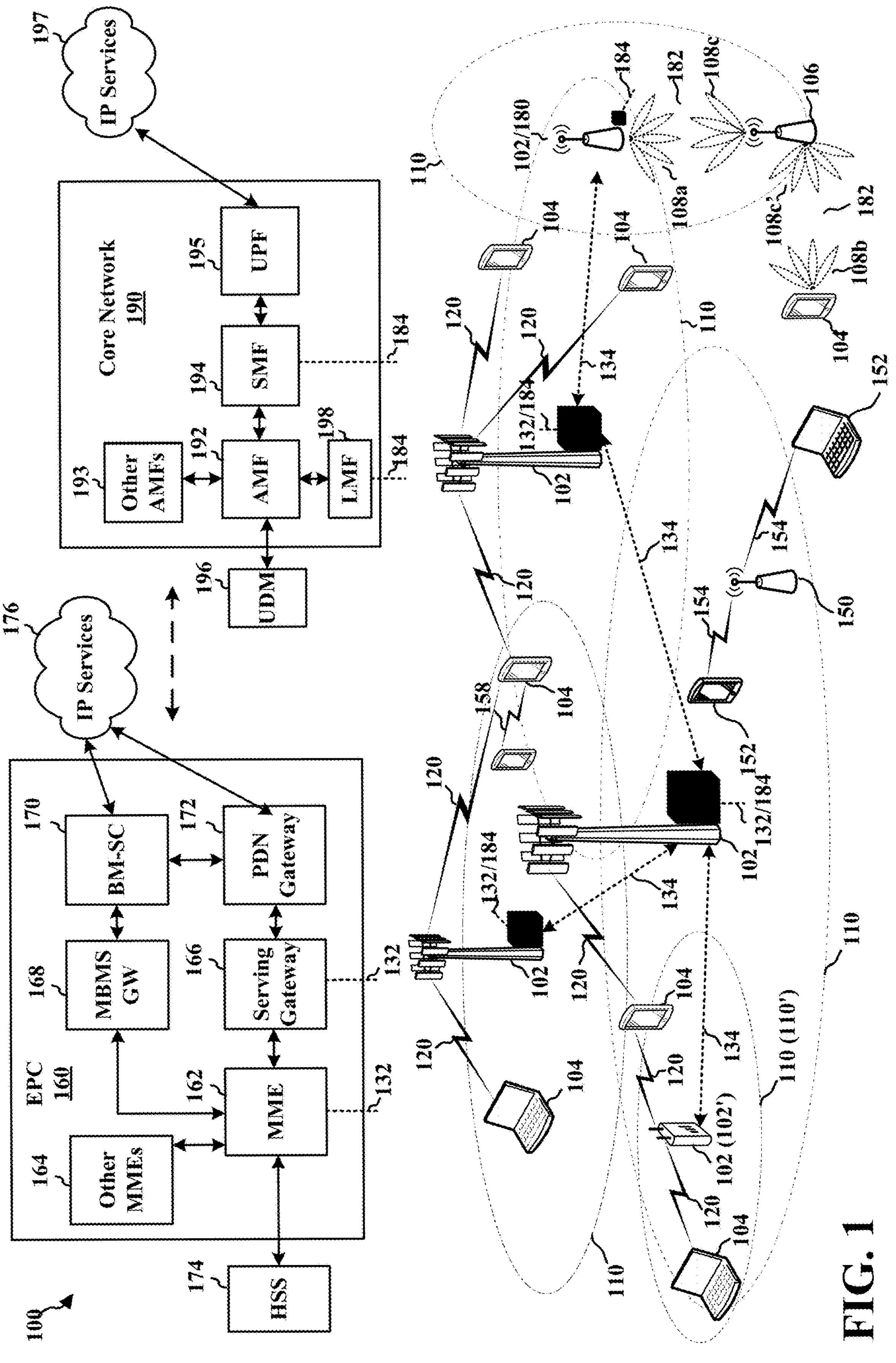
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102" may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
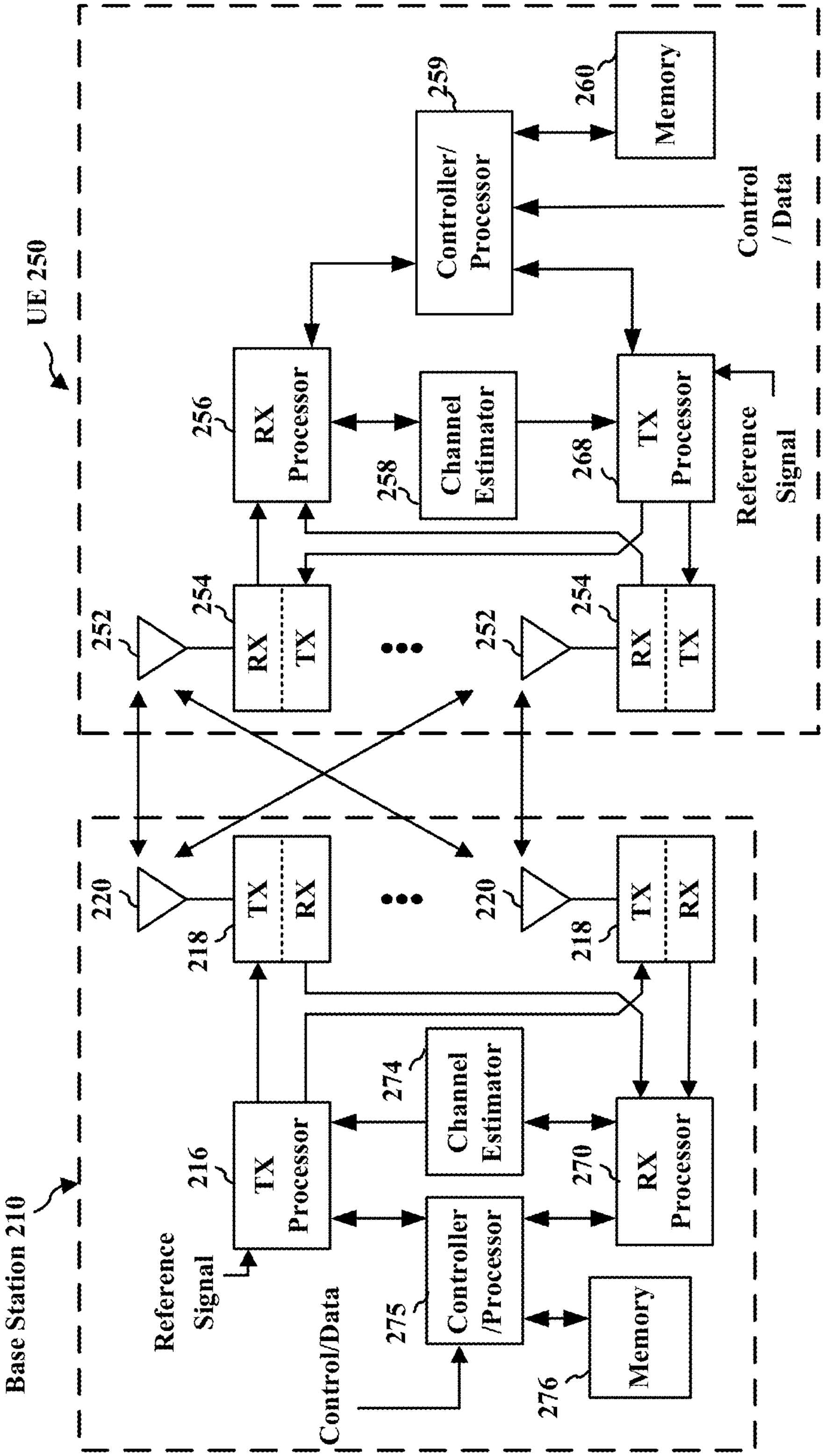
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs: and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270).

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers for each RB with a sub-carrier spacing (SCS) of 60 kHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
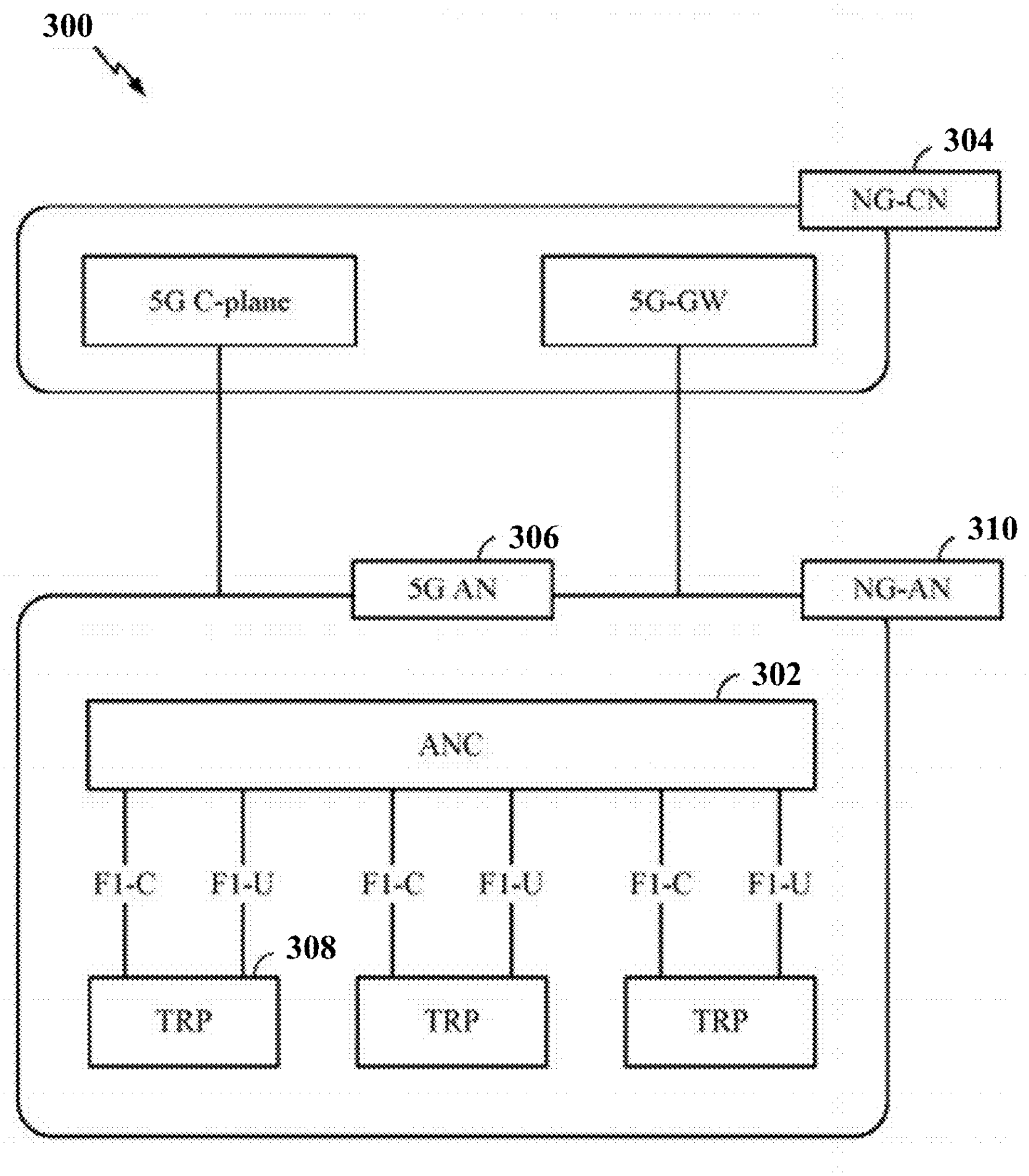
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
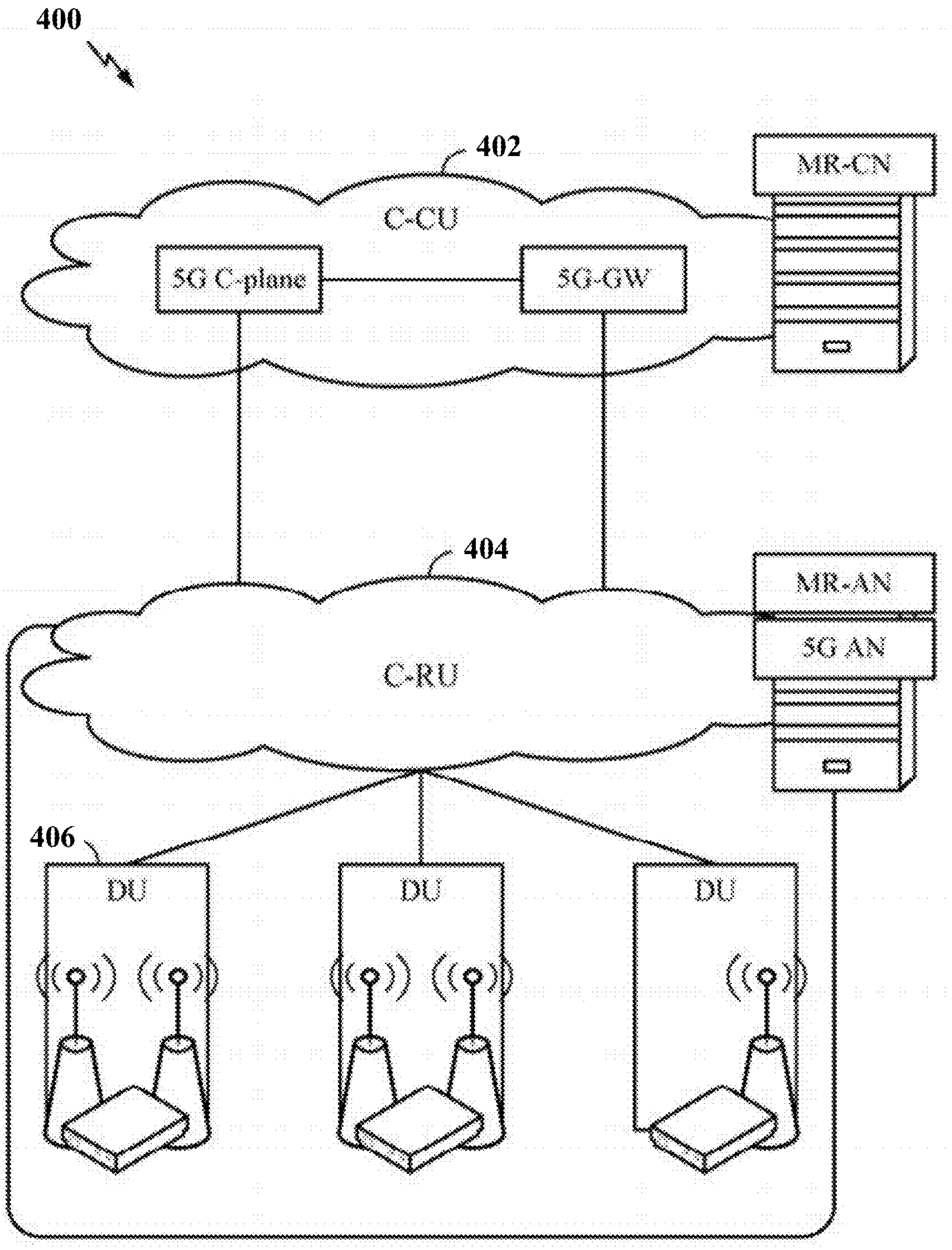
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
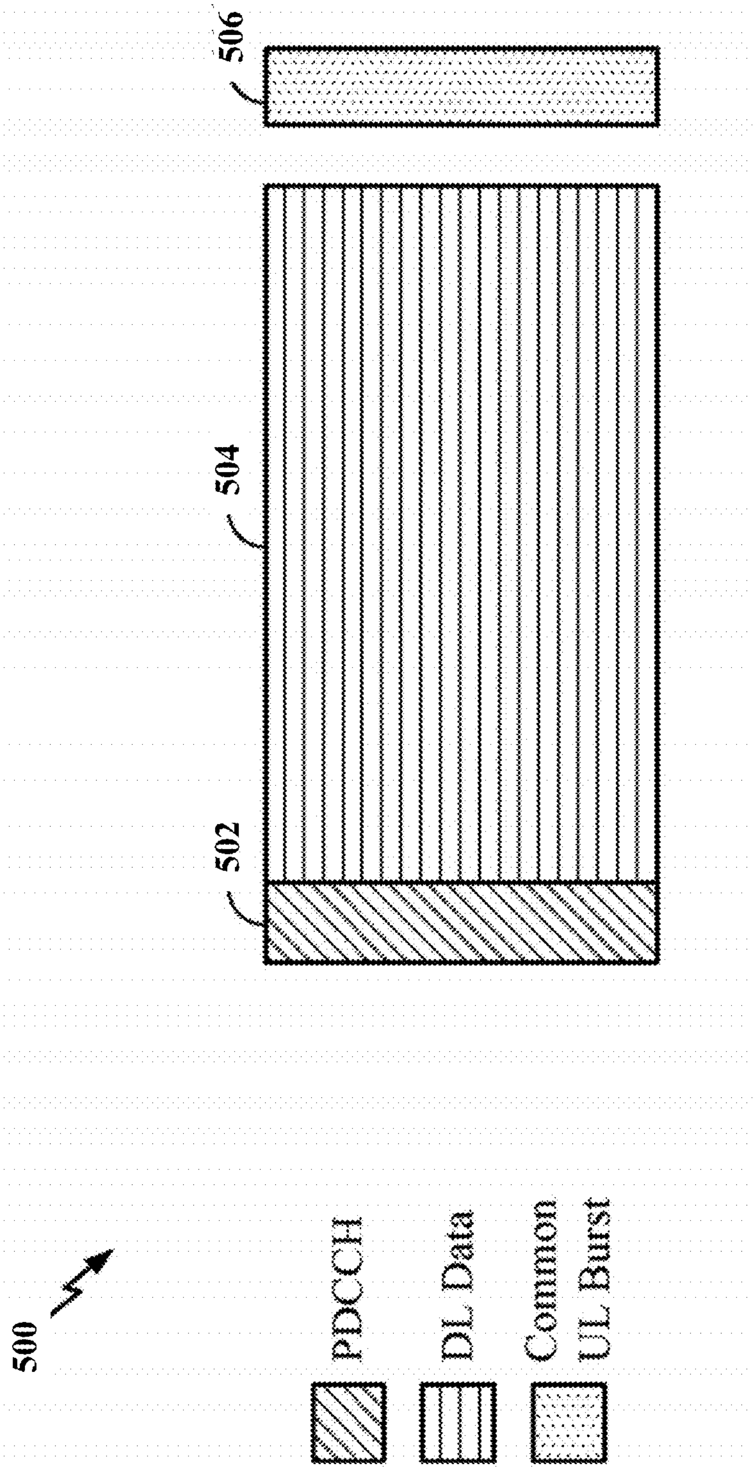
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
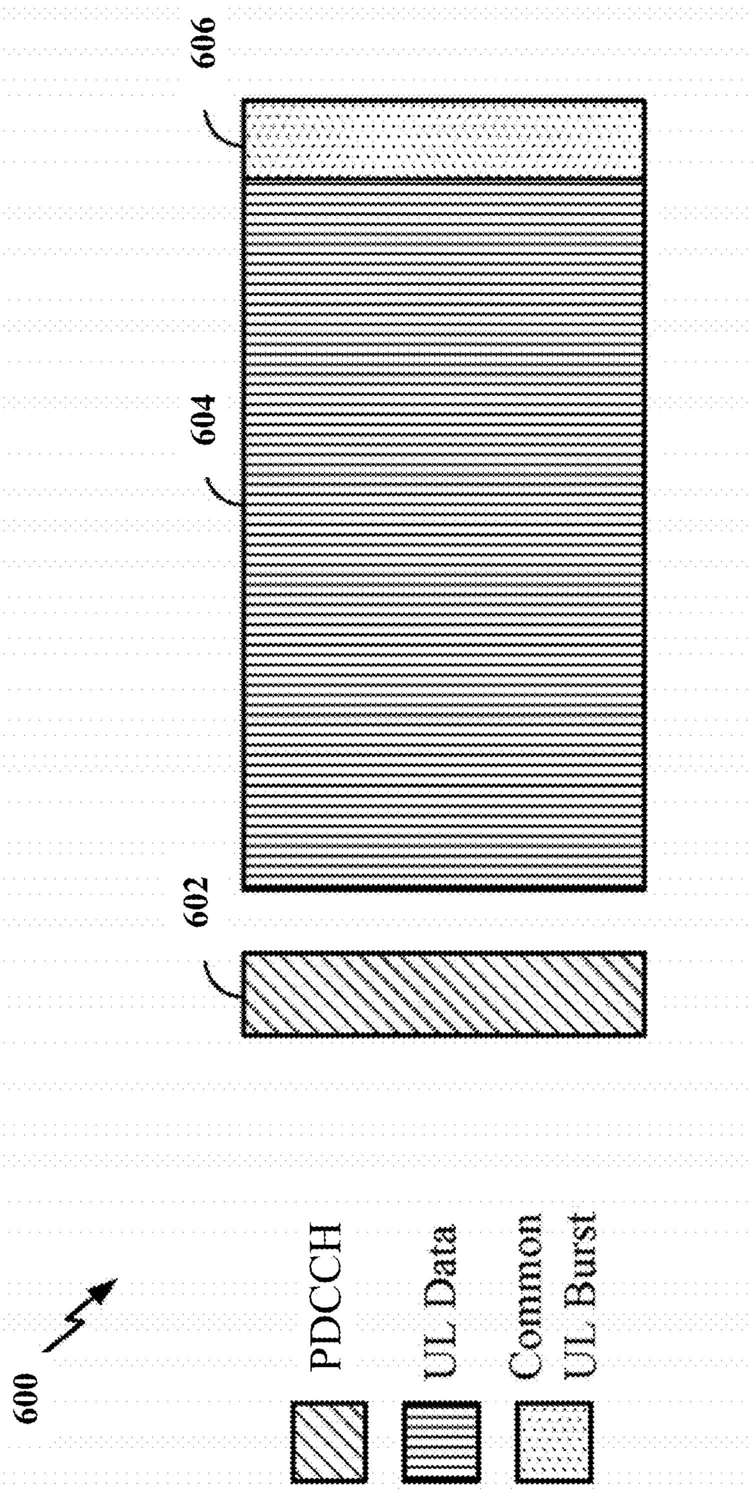
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Shannon capacity represents the ultimate upper bound on the achievable rate for an AWGN (Additive White Gaussian Noise) channel with an average signal power constraint. Modern FEC (Forward Error Correction) codes, such as LDPC (Low-Density Parity-Check) codes, Polar codes, and CC-LDPC (Convolutional Coded Low-Density Parity-Check) codes, can approach or asymptotically achieve the Shannon capacity as the codeword length increases.

However, in practical scenarios, the codeword length is finite. For FEC with finite codeword length, the performance gap between the achievable rate and the Shannon capacity can be estimated using the Sphere Packing Bound (SPB). A simplified bound is given by the following equation:

$$\Delta\left[\frac{E_b}{N_0}\right]_{dB} \geq \sqrt{\left(\frac{40}{\ln 10}\right)\times\left(r\frac{2^{2r}+1}{2^{2r}-1}\right)\times\frac{P_{w,dB}^{-1}}{k}}$$

Generally, the Shannon capacity is achieved with Gaussian-distributed input symbols: however, most practical communication systems deploy uniformly distributed QAM (Quadrature Amplitude Modulation) symbols (i.e., non-Gaussian distributed constellation symbols).

Constellation shaping can mitigate (or reduce) the corresponding performance gap. From an information theory perspective, for an AWGN channel with an average signal power constraint, the capacity-achieving input symbol distribution is Gaussian. By comparing the differential entropy of Gaussian and uniform distributions, the ultimate shaping gain can be calculated as:

$$G_{s,\infty} = \frac{\pi e}{6} = 1.53\text{ dB}$$

Figure 7:
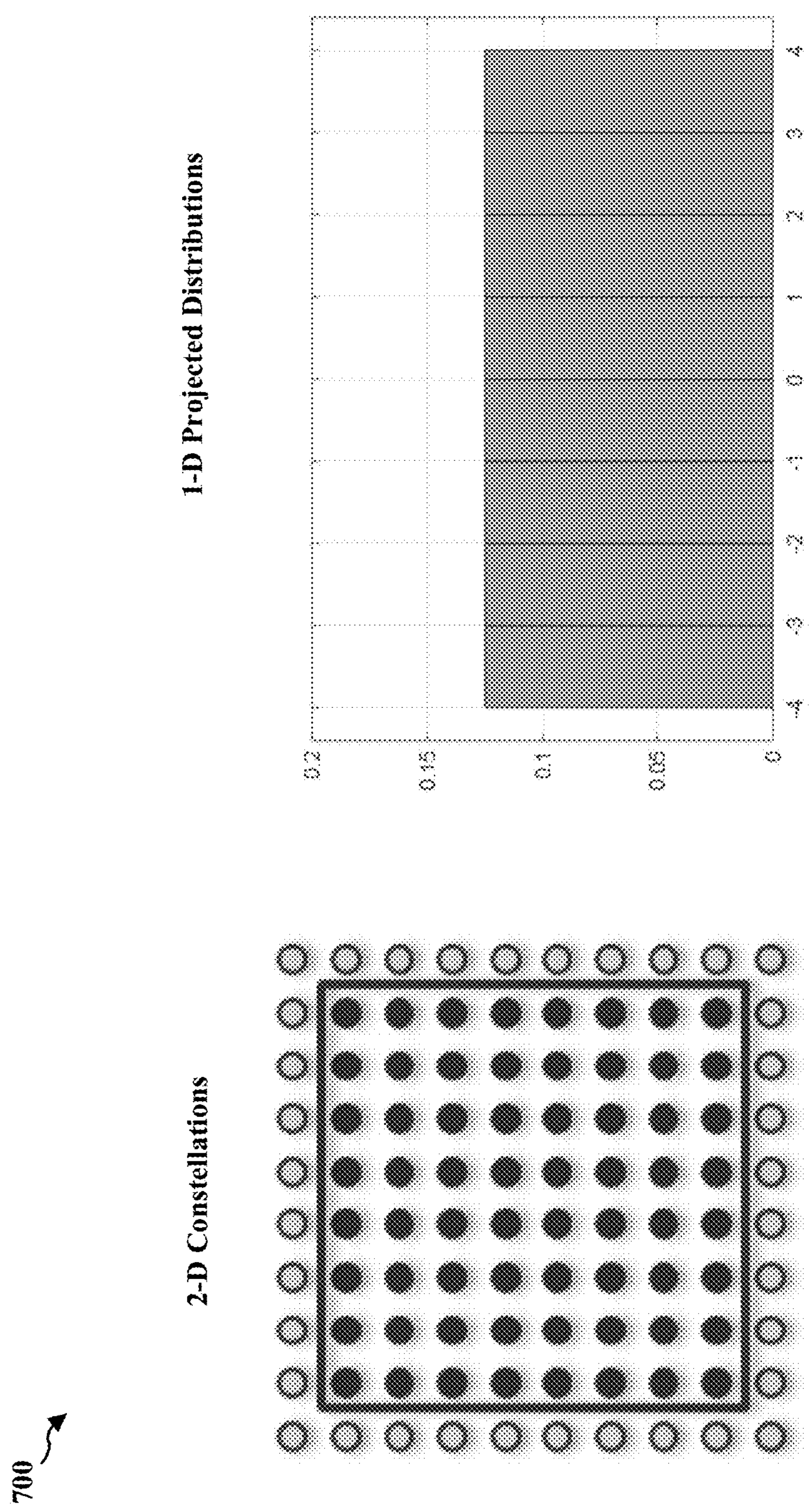
FIG. 7 is a diagram illustrating a uniformly distributed constellation in a two-dimensional (2-D) constellation diagram.

FIG. 7 is a diagram 700 illustrating a uniformly distributed constellation in a two-dimensional (2-D) constellation diagram. From a geometrical perspective, a uniformly distributed constellation in a 2-D constellation diagram (e.g., within a square boundary) reflects an even probability of occurrence, resulting in a uniformly distributed 1-D (one-dimensional) projection.

Figure 8:
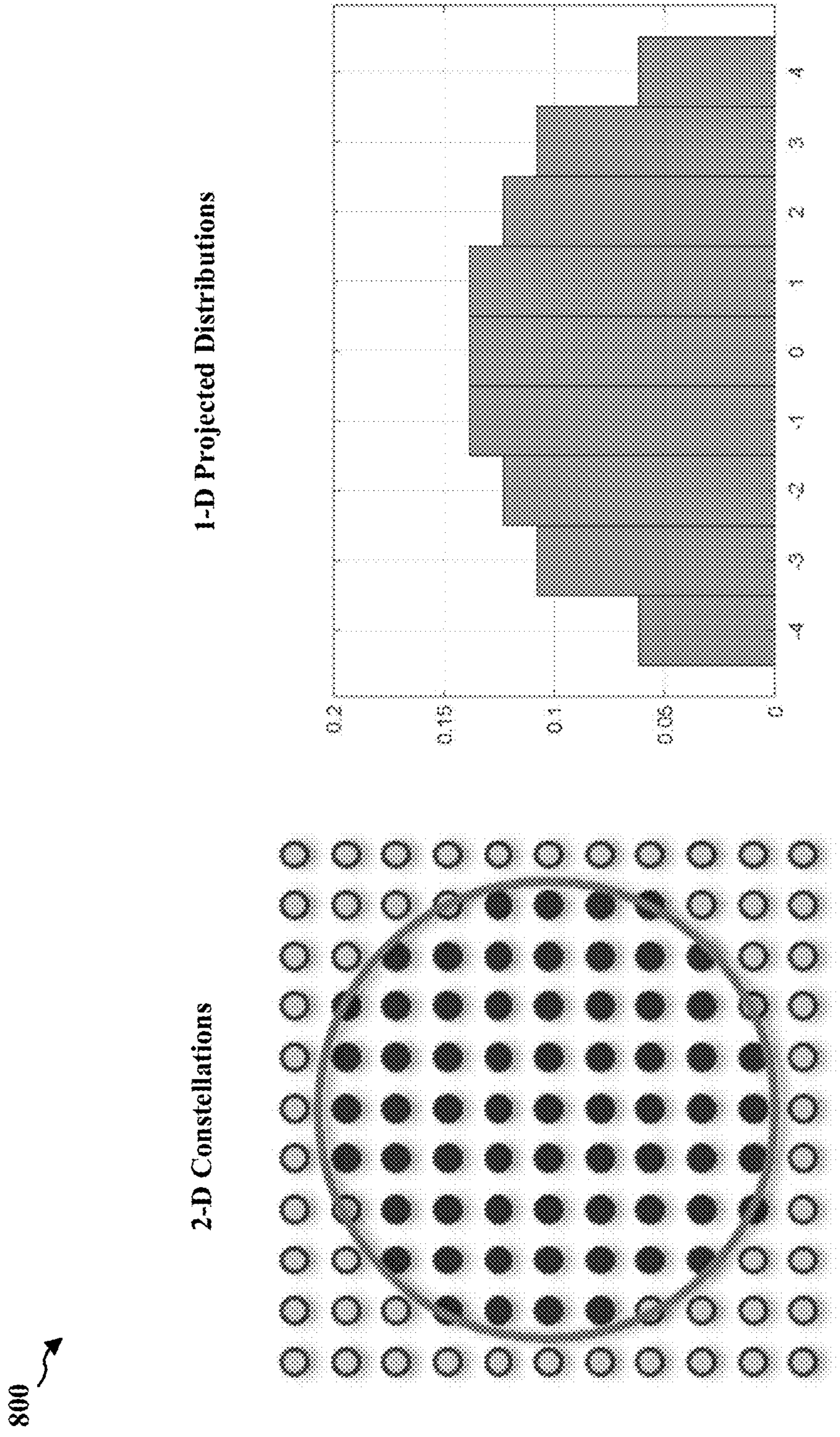
FIG. 8 is a diagram illustrating constellation shaping.

FIG. 8 is a diagram 800 illustrating constellation shaping. As shown, constellation shaping involves constraining the constellation within a circular boundary in a 2-D diagram, yielding a projection in 1-D that approximates a Gaussian distribution. Further, the shape of a bounded, N-dimensional region R that minimizes the average energy E(R) is an N-dimensional hyper-sphere. As N approaches infinity, the 1-D projection of an N-dimensional hyper-sphere converges to a Gaussian distribution. In other words, to achieve shaping gain, one could minimize the average constellation energy in a higher dimensional space.

The gap between QAM SIR (Signal to Interference Ratio) and AWGN Capacity, i.e., the potential shaping gain, widens as the transmission rate increases. The AWGN capacity curve keeps increasing with higher signal-to-noise ratio (SNR), while QAM hits a plateau where further increases in SNR do not help. This is the shaping gap. At higher rates, QAM constellations become denser, leading to higher likelihood of errors due to inter-symbol interference. This reduces the achievable rate compared to AWGN capacity. QAM symbols have a uniform probabilistic distribution at the same energy, whereas AWGN capacity is achieved using Gaussian-distributed symbols. The non-Gaussian QAM distribution is suboptimal. The potential for shaping gain lies in modifying the QAM constellation to approximate a Gaussian distribution, through optimization techniques like Trellis shaping. This can help close the gap to AWGN capacity at high rates. The shaping gain is more substantial at higher transmission rates. For low rates (i.e., in low SNR regions), the gap is negligible. However, as the rate increases, the gap becomes significant. When the rate approaches infinity, this gap approaches $G_{\infty,s}$=1.53 dB (i.e., the ultimate shaping gain).

For an N-dimensional lattice, the constellation defined by an N-dimensional hyper-sphere provides the maximum shaping gain. The corresponding shaping gain increases with the underlying dimension. When the dimension approaches infinity, the shaping gain approaches $G_{\infty,s}$=1.53 dB. Empirically, a shaping gain of more than 1 dB can be achieved when working within a 20-dimensional constellation.

Figure 9:
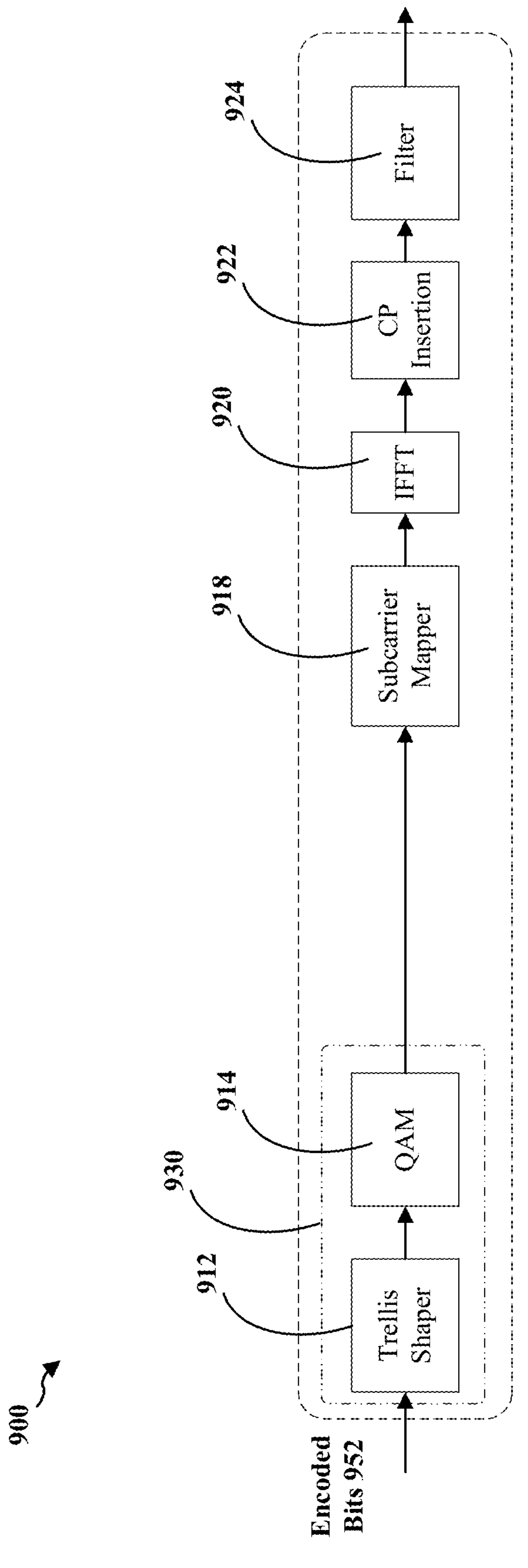
FIG. 9 is a diagram illustrating a transmitter chain.

FIG. 9 is a diagram 900 illustrating a transmitter chain. In this example, a transmitter chain 910 includes a Trellis shaper 912, a QAM modulator 914, a subcarrier mapper 918, an IFFT component 920, a CP insertion component 922, and a filter 924.

The Trellis shaper 912 receives encoded bits 952 from, for example, an FEC encoder. The Trellis shaper 912 manipulates the encoded bits 952 and sends the resulting bits to the QAM modulator 914, which accordingly generates constellation symbols. That is, the Trellis shaper 912 is combined with the QAM modulator 914 to form a coded modulation mechanism 930. The coded modulation is designed to map an input sequence to a valid constellation sequence that has the least average energy, which results in a constellation sequence that manifests a “Gaussian like” distribution. Shaping gain increases with the length of the shaping code C. Nevertheless, the gain eventually saturates where further increments in code length offer negligible benefits.

The subcarrier mapper 918 receives frequency domain symbols from the QAM modulator 914 and maps the frequency domain symbols onto the allocated subcarriers. This converts the frequency domain symbols into an OFDM signal. The IFFT component 920 then performs an Inverse FFT to convert the frequency domain OFDM signal back to the time domain for transmission. The CP insertion component 922 inserts a cyclic prefix into the time domain signal to mitigate inter-symbol interference.

The filter 924 performs shaping on the transmitted signal to control the spectral shape and out-of-band emissions. Specifically, it helps smooth the abrupt transitions in the transmitted waveform to reduce spectral sidelobes. This allows the signal to better fit into the allocated frequency band and reduces interference to adjacent frequency channels.

Figure 10:
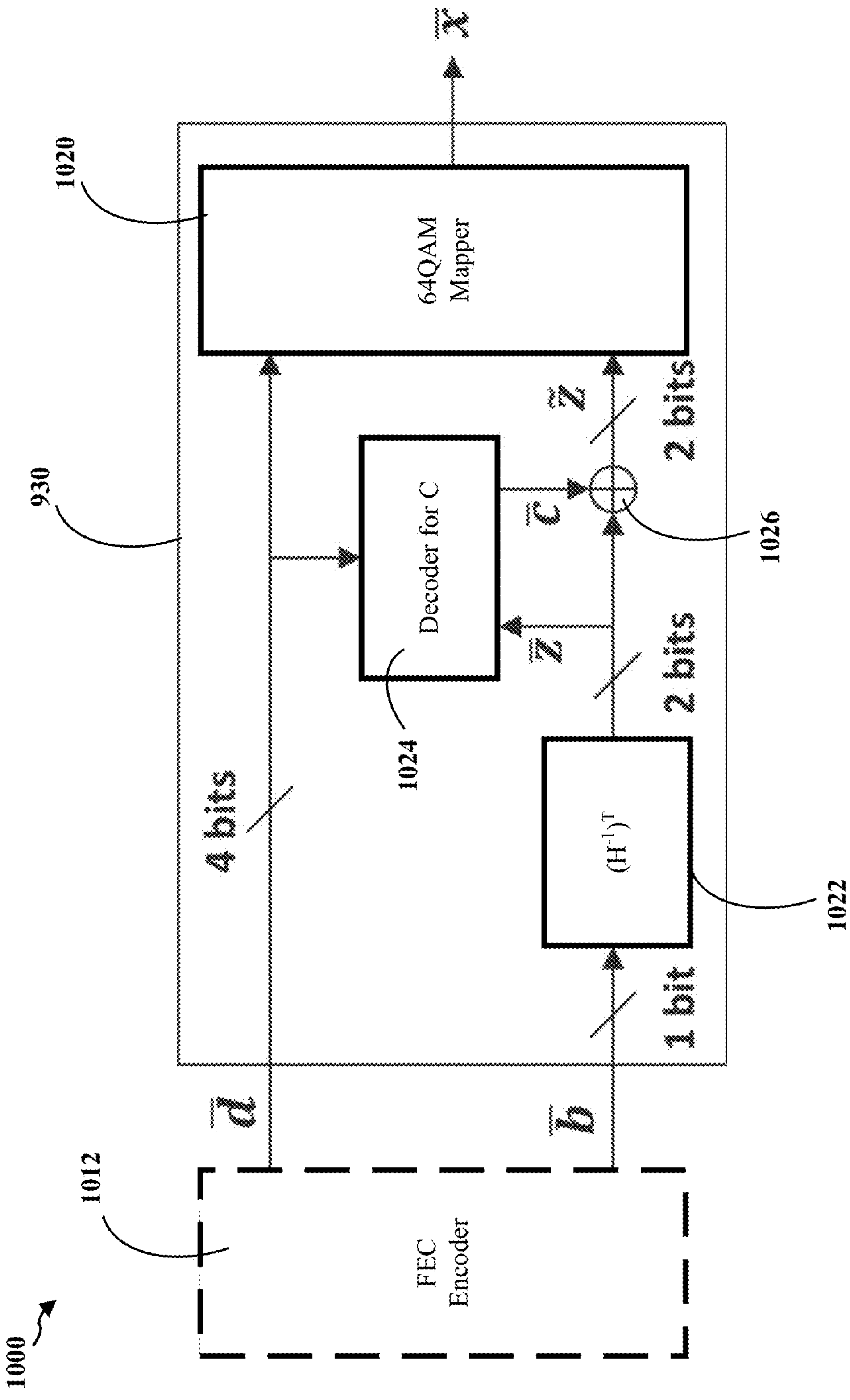
FIG. 10 is a diagram illustrating a coded modulation mechanism.

FIG. 10 is a diagram 1000 illustrating a coded modulation mechanism 930. The coded modulation mechanism 930 includes a 64 QAM mapper 1020, a coset representative generator 1022, a decoder 1024, and a binary field 1026.

In this example, a FEC encoder 1012 may generates N sets of encoded bits each to be mapped to a 64Q AM symbol by the coded modulation mechanism 930. Each set contains 4 bits denoted as $\bar{d}$ and 1 bit denoted as $\bar{b}$. The bits $\bar{d}$ are input directly to the 64 QAM mapper 1020. The bit $\bar{b}$ is input into the coset representative generator 1022, which is encoded a rate ½ coset representative generator $(H^{-1})^T$. The output of the coset representative generator 1022 are 2 bits, which are denoted as $\bar{z}$.

The bits $\bar{z}$ and the bits $\bar{d}$ are input into the decoder 1024 to generate a shaping codeword $\bar{c}$. The decoder 1024 implements a Trellis or a lattice structure, which includes all the possible codewords that satisfy the shaping code's constraints. The shaping codeword $\bar{c}$, which are 2 bits in this example, is added to $\bar{z}$ within a binary field 1026, (GF(2) or Galois Field 2), which means that addition is equivalent to the XOR operation in binary. The output of the binary field 1026 are two bits, which are denoted as $\tilde{z}$.

Figure 11:
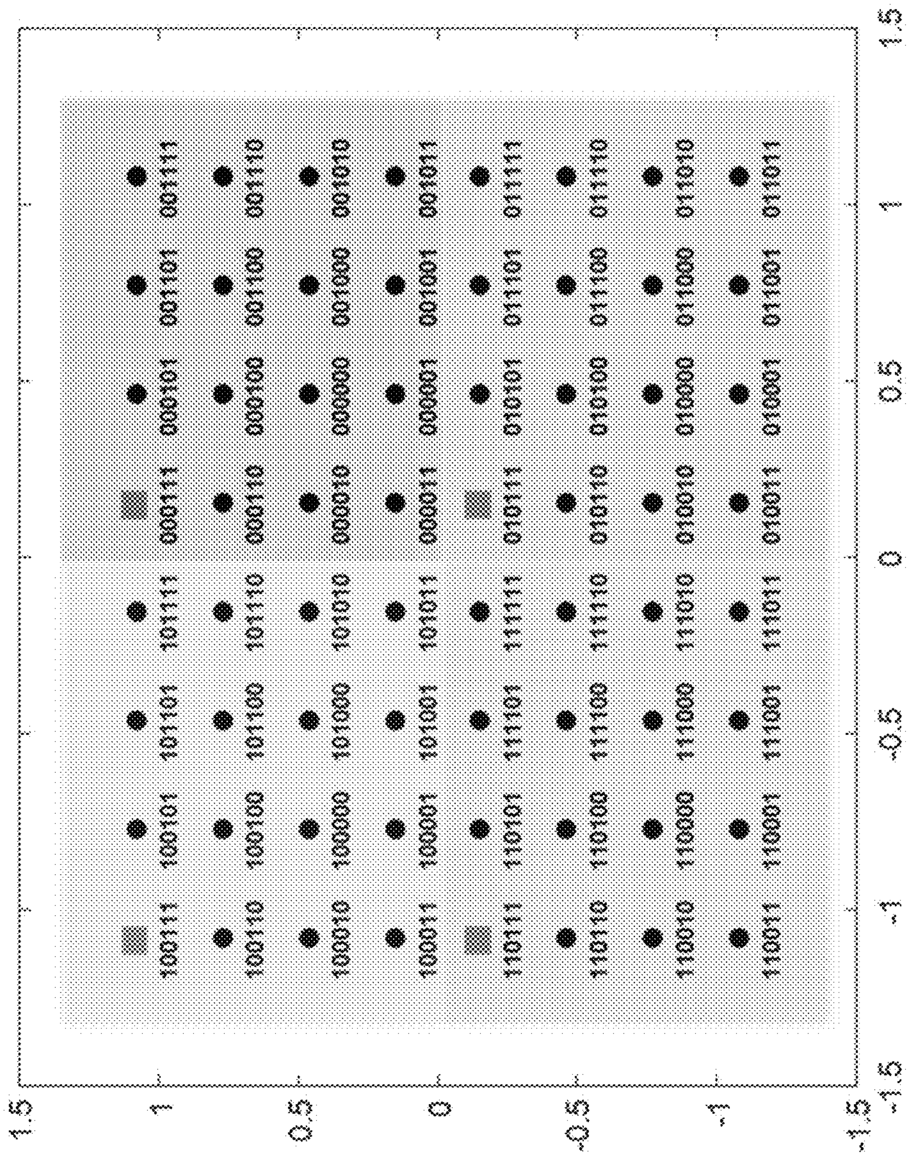
FIG. 11 is a diagram illustrating a base constellation of 64QAM utilized by a 64QAM mapper.

FIG. 11 is a diagram 1100 illustrating a base constellation of 64 QAM utilized by the 64 QAM mapper 1020. The bits $\bar{d}$ and $\tilde{z}$ are input into the 64 QAM mapper 1020 for generating a 64 QAM symbol. For each 64 QAM symbol, 2 coded bits from $\tilde{z}$ are used to select the quadrant, and 4 other bits from $\bar{d}$ are used to select one of the 16 constellation points within each quadrant.

Referring back to FIG. 10, the primary function of the decoder 1024 is to operate on the input bits $\bar{z}$ and $\bar{d}$. These six bits are then processed within the decoder 1024 to generate the shaping codeword $\bar{c}$. The objective is to select such a shaping codeword $\bar{c}$ from within the shaping code that the $\tilde{z}$ derived accordingly and the bits $\bar{d}$ would result in a 64 QAM constellation point with the minimum possible average energy. In other words, the goal of the decoder 1024 is to select a shaping codeword $\bar{c}$ that yields the least average energy for the constellation points.

Further, the Viterbi Algorithm (VA) can be utilized to perform code selection, typically finding the codeword which minimizes the Euclidean distance to the received codeword. By making minor modifications to the criteria used within the VA, the VA can be repurposed to select the codeword that minimizes the accumulated, and consequently, average energy. The decoder 1024 operates on the shaping code by computing the accumulated energy of the QAM symbols specified by $\bar{d}$ and $\tilde{z}$. Once the decoder 1024 finds the minimum of the aggregated energy, the decoder 1024 can trace back to find the corresponding shaping codeword $\bar{c}$. With this selected shaping codeword $\bar{c}$, the mapped 64-QAM symbols may have the minimum average energy.

Figure 12:
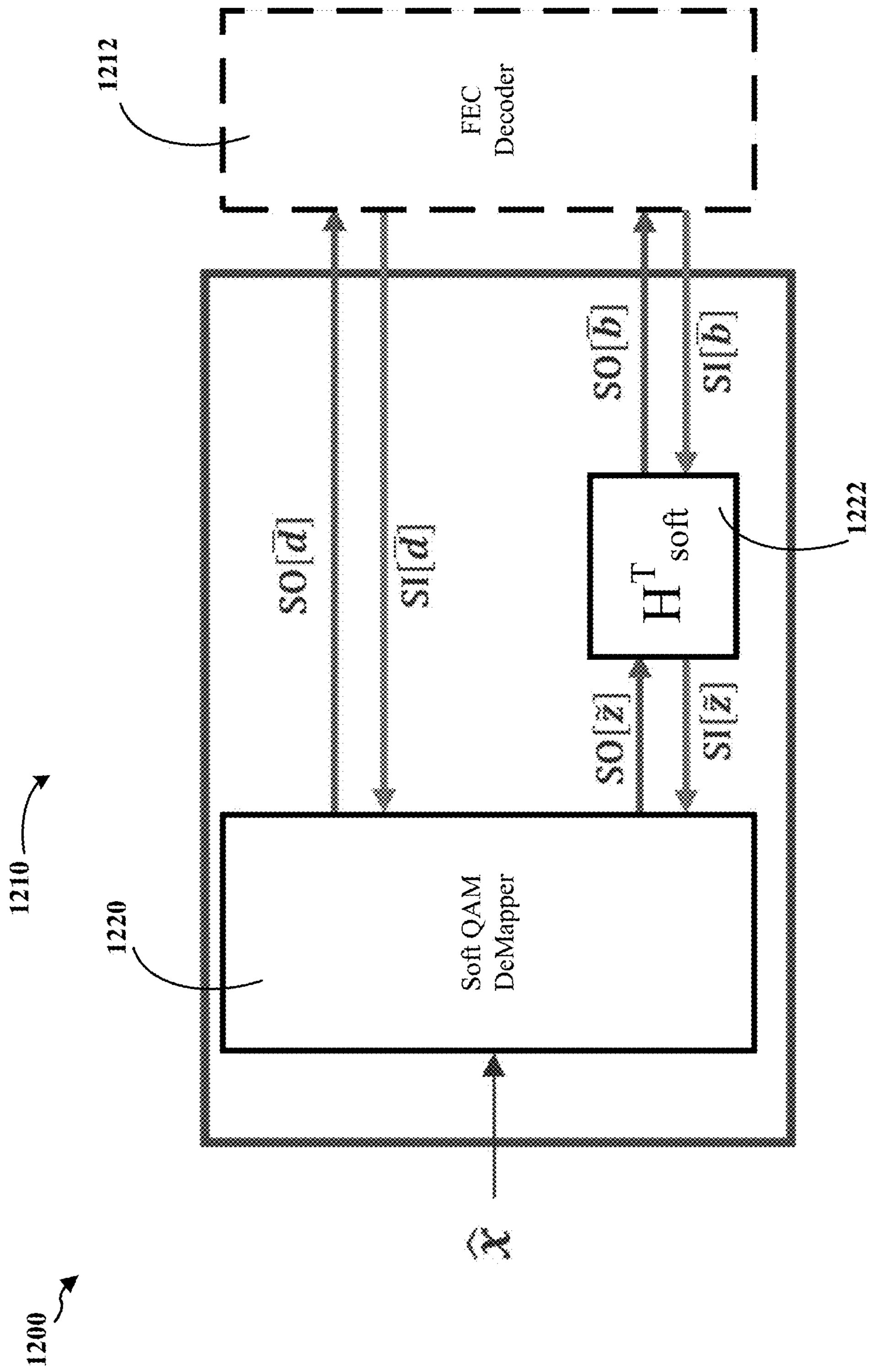
FIG. 12 is a diagram illustrating a soft Trellis de-shaper at a receiver.

FIG. 12 is a diagram 1200 illustrating a soft Trellis de-shaper 1210 at a receiver. In this example, the soft Trellis de-shaper 1210 includes a soft QAM demapper 1220 and a soft syndrome former 1222.

As described supra, the transmitter transmits signals carrying 64 QAM symbols generated by the 64 QAM mapper 1020 to the receiver. For example, the receiver may receive a 64 QAM symbol $\hat{x}$ transmitted from the transmitter. The symbol $\hat{x}$ is then input into the soft QAM demapper 1220, which generates a soft output of 4 bits $\bar{d}$, denoted as SO[$\bar{d}$], as well as a soft output of 2 bits $\tilde{z}$, denoted as SO[$\tilde{z}$].

The SO[$\tilde{z}$] are input into the soft syndrome former 1222. The soft syndrome former 1222, represented as $H^T$ and corresponding to the shaping code C, can recover $\bar{b}$ from $\tilde{z}$:

$$\bar{b}=\tilde{z}H^T=(\bar{z}+\bar{c})H^T.$$

As such, the soft syndrome former 1222 generates a soft output of 1 bit $\bar{b}$, denoted as SO[$\bar{b}$]. The soft syndrome former 1222 also generates a soft input of SI[$\tilde{z}$], and feed it back to the soft QAM demapper 1220.

The soft syndrome former matrix $H^T$ is directly related to the specific shaping code C utilized in the transmitter's decoder 1024. The shaping code C represents the set of all valid codewords that can be chosen by the Trellis shaper in order to minimize the energy of the transmitted constellation points. This shaping code C has an associated parity check matrix H. When selecting a shaping codeword c from code C to apply, the transmitter adds this codeword (in GF(2)) to the encoded bits $\bar{z}$ to generate the shaped bits $\tilde{z}$.

At the receiver, the soft syndrome former matrix $H^T$ essentially represents the parity check matrix of the shaping code C transposed. Mathematically, any shaping codeword c within code C multiplied by H produces zero. Therefore, the relationship $\bar{c}H^T=0$ holds based on the properties of the shaping code C. As a result, the soft syndrome former $H^T$ can effectively “remove” the contribution of the selected shaping codeword c and recover the original encoded bits $\bar{b}$ via the operation $\tilde{z}H^T$.

The SO[$\bar{b}$] are, along with the SO[$\bar{d}$], then input into the FEC decoder 1212. Accordingly, the FEC decoder 1212 generates a soft input of SI[$\bar{d}$], and feed it back to the soft QAM demapper 1220. The FEC decoder 1212 generates a soft input of SI[$\bar{b}$], and feed it back to the soft syndrome former 1222.

This iterative exchange of soft information between the FEC decoder 1212 and the soft QAM demapper 1220/the soft syndrome former 1222 enables the potential shaping gain to be realized. Specifically, the soft QAM demapper 1220 and soft syndrome former 1222 can successively refine their outputs by leveraging the additional soft information fed back from the FEC decoder 1212. This allows the soft Trellis de-shaper 1210 to converge on optimal soft outputs that maximize the shaping gain. Without such iterations, the potential gain would not be fully achieved since the FEC decoder outputs would not be utilized. Therefore, the proposed architecture with soft de-shaper components and iterative information exchange is beneficial to approaching the maximum possible shaping gain.

The soft inputs SI[$\bar{d}$] from the FEC decoder 1212 represent refined confidence estimates on the uncoded bits $\bar{d}$. These are fed back to the soft QAM demapper 1220 to help improve its soft symbol metrics. Specifically, the soft QAM demapper 1220 initially generates soft outputs SO[$\bar{d}$] based solely on the received symbol $\hat{x}$. These are passed to the FEC decoder 1212.

The FEC decoder leverages its advanced algorithms to refine the bit-level confidence values, generating optimized soft inputs SI[$\bar{d}$] that are then fed back to the QAM demapper 1220. Now in the next iteration, the soft QAM demapper 1220 can incorporate these improved SI[$\bar{d}$] as a prior information when re-estimating the bits $\bar{d}$ and computing new soft outputs SO[$\bar{d}$].

For example, if the SI[$\bar{d}$] indicates high confidence that a particular bit $\bar{d}_i$=0, the soft QAM demapper 1220 can update its metrics to favor constellation points where $\bar{d}_i$=0.

This allows the soft QAM demapper 1220 to benefit from the additional context provided by the powerful FEC decoder when computing its soft symbol metrics, rather than just relying on the received channel values.

The soft inputs SI[$\tilde{z}$] from the soft syndrome former represent refined confidence estimates on the coded bits $\tilde{z}$. These are fed back to the soft QAM demapper 1220 to help improve its soft symbol metrics.

Specifically, the soft QAM demapper 1220 initially generates soft outputs SO[$\tilde{z}$] based solely on the received symbol $\tilde{x}$. These are passed to the soft syndrome former 1222. The soft syndrome former leverages its computations to refine the confidence values on $\tilde{z}$, generating optimized soft inputs SI[$\tilde{z}$] that are fed back to the QAM demapper 1220.

Now in the next iteration, the soft QAM demapper 1220 can incorporate these improved SI[$\tilde{z}$] as a prior information when re-estimating $\tilde{z}$ and computing new soft outputs SO[$\tilde{z}$]. For example, if the SI[$\tilde{z}$] indicates high confidence in a particular value for $\tilde{z}_i$, the soft QAM demapper 1220 can update its metrics to favor constellation points consistent with that value. This allows the soft QAM demapper 1220 to benefit from the additional processing and context provided by the soft syndrome former when computing its soft symbol metrics, rather than just relying on the received channel values.

The soft input SI[$\bar{b}$] from the FEC decoder 1212 represents refined confidence information on the original information bits $\bar{b}$. When this is fed back to the soft syndrome former 1222, it can be used to update the soft syndrome former's estimates of $\bar{b}$. Specifically, the soft syndrome former 1222 can combine the SI[$\bar{b}$] from the FEC decoder with its internally computed metrics to generate improved soft outputs SO[$\bar{b}$].

For example, the soft syndrome former 1222 may initially estimate $\bar{b}$ based solely on the received symbol $\hat{x}$ and generate soft outputs SO[$\bar{b}$]. These are passed to the FEC decoder.

The FEC decoder 1212 can then leverage its advanced decoding algorithms (e.g. belief propagation) to refine the confidence estimates of $\bar{b}$, producing optimized soft inputs SI[$\bar{b}$] that are fed back to the soft syndrome former 1222.

Now in the next iteration, the soft syndrome former 1222 can factor in these improved SI[$\bar{b}$] when re-estimating $\bar{b}$ to generate enhanced SO[$\bar{b}$].

The SI[$\bar{b}$] allow the soft syndrome former 1222 to benefit from the additional processing and context provided by the powerful FEC decoder 1212, rather than just relying on its own limited perspective. This exchange of soft information is key to maximizing the achievable shaping gain.

Figure 13:
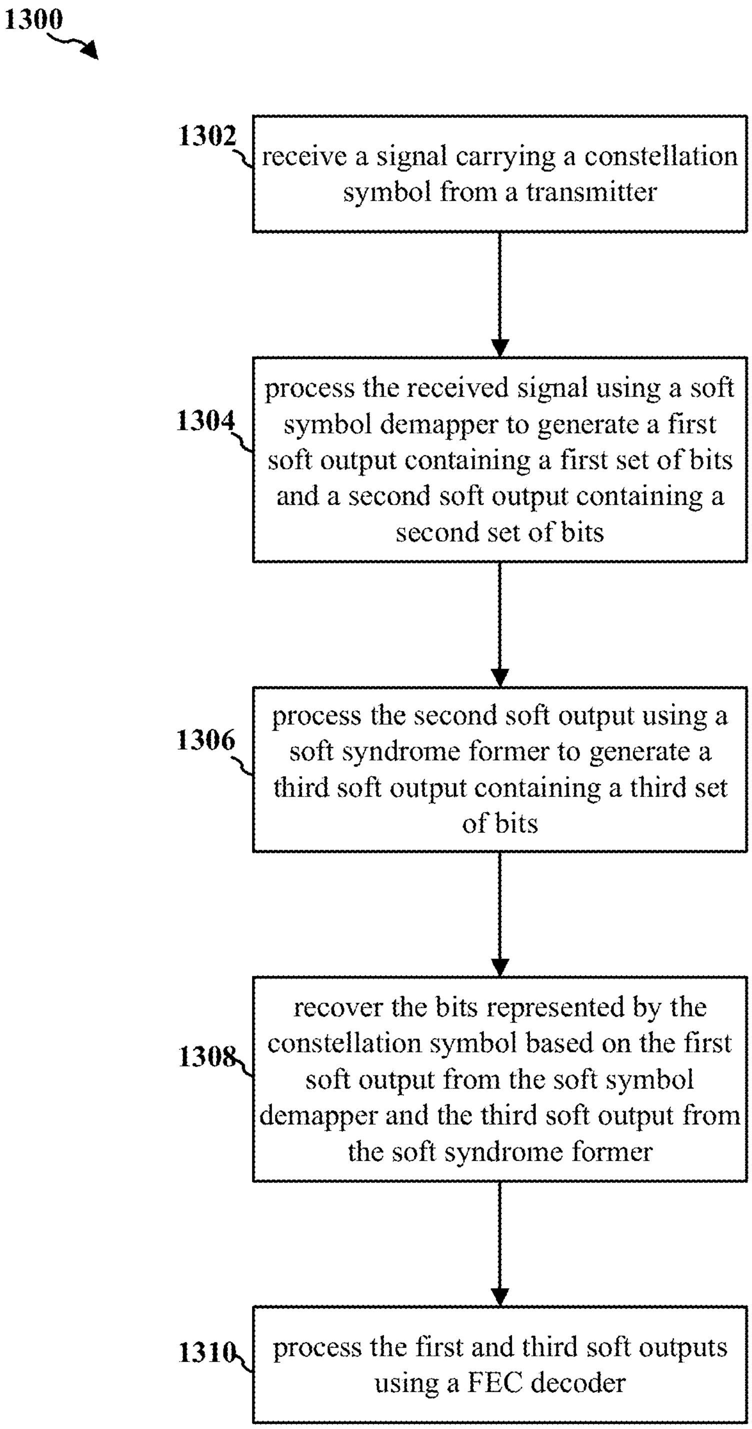
FIG. 13 is a flow chart of a method (process) for decoding.

FIG. 13 is a flow chart 1300 of a method (process) for decoding. The method may be performed by a receiver (e.g., the base station 210, the UE 250). In operation 1302, the receiver receives a signal carrying a constellation symbol from a transmitter. In operation 1304, the receiver processes the received signal using a soft symbol demapper to generate a first soft output containing a first set of bits and a second soft output containing a second set of bits.

In operation 1306, the receiver processes the second soft output using a soft syndrome former to generate a third soft output containing a third set of bits. The soft syndrome former corresponds to a shaping code that was applied at the transmitter to shape the constellation. In operation 1308, the receiver recovers the bits represented by the constellation symbol based on the first soft output from the soft symbol demapper and the third soft output from the soft syndrome former. In operation 1310, the receiver processes the first and third soft outputs using a FEC (forward error correction) decoder.

In certain configurations, the FEC decoder generates a first soft input corresponding to the first soft output, and a third soft input corresponding to the third soft output. The first soft input may be fed back to the soft symbol demapper. This allows the demapper to refine its metrics by leveraging the additional context from the FEC decoder. The third soft input may be fed back to the soft syndrome former. This allows the soft syndrome former to refine its estimates of the third set of bits using information from the FEC decoder.

In certain configurations, soft information is iteratively exchanged between the FEC decoder, soft symbol demapper, and soft syndrome former. This iterative process enables convergence on optimal soft outputs to maximize shaping gain. The second soft output from the soft symbol demapper is further processed by the soft syndrome former to generate a second soft input. The second soft input is fed back to the soft symbol demapper.

In certain configurations, the soft symbol demapper computes soft metrics for the received constellation symbol based on the received signal as well as the first soft input, second soft input, and any other available a priori information. The first set of bits output by the soft symbol demapper include bits that are uncoded by the shaping code. The second set of bits include bits that are coded by the shaping code.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary." is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a receiver, comprising:

receiving, from a transmitter, a signal carrying a constellation symbol;

processing the received signal by a soft symbol demapper to generate, based on the same constellation symbol, a first soft output of a first set of bits corresponding to unshaped bits for selecting one of a plurality of constellation points within a quadrant of a constellation and a second soft output of a second set of bits corresponding to shaped bits for selecting the quadrant, wherein the first soft output and the second soft output comprise soft bit metrics with confidence information;

processing the second soft output by a soft syndrome former to generate a third soft output of a third set of bits and a second soft input corresponding to the second soft output, wherein the soft syndrome former corresponds to a shaping code applied at the transmitter and computes the third soft output by applying a syndrome former matrix to the second soft output to recover syndrome bits from the shaped bits;

feeding back the second soft input from the soft syndrome former to the soft symbol demapper, wherein the soft symbol demapper uses the second soft input as prior information for computing soft metrics for the constellation symbol; and recovering bits represented by the constellation symbol based on the first soft output and the third soft output.

2. The method of claim 1, further comprising:

processing the first soft output and the third soft output by a forward error correction (FEC) decoder to generate a first soft input corresponding to the first soft output and a third soft input corresponding to the third soft output.

3. The method of claim 2, further comprising:

feeding back the first soft input to the soft symbol demapper.

4. The method of claim 3, further comprising:

feeding back the third soft input to the soft syndrome former.

5. The method of claim 4, further comprising:

iteratively exchanging soft information between the FEC decoder, the soft symbol demapper, and the soft syndrome former.

6. The method of claim 3, wherein processing the received signal by the soft symbol demapper comprises:

computing soft metrics for the constellation symbol based on the received signal, the first soft input, and the second soft input.

7. An apparatus for wireless communication, the apparatus being a receiver, comprising:

a memory; and at least one processor coupled to the memory and configured to:

receive, from a transmitter, a signal carrying a constellation symbol;

process the received signal by a soft symbol demapper to generate, based on the same constellation symbol, a first soft output of a first set of bits corresponding to unshaped bits for selecting one of a plurality of constellation points within a quadrant of a constellation and a second soft output of a second set of bits corresponding to shaped bits for selecting the quadrant, wherein the first soft output and the second soft output comprise soft bit metrics with confidence information;

process the second soft output by a soft syndrome former to generate a third soft output of a third set of bits and a second soft input corresponding to the second soft output, wherein the soft syndrome former corresponds to a shaping code applied at the transmitter and computes the third soft output by applying a syndrome former matrix to the second soft output to recover syndrome bits from the shaped bits;

feed back the second soft input from the soft syndrome former to the soft symbol demapper, wherein the soft symbol demapper uses the second soft input as prior information for computing soft metrics for the constellation symbol; and recover bits represented by the constellation symbol based on the first soft output and the third soft output.

8. The apparatus of claim 7, wherein the at least one processor is further configured to:

process the first soft output and the third soft output by a forward error correction (FEC) decoder to generate a first soft input corresponding to the first soft output and a third soft input corresponding to the third soft output.

9. The apparatus of claim 8, wherein the at least one processor is further configured to:

feed back the first soft input to the soft symbol demapper.

10. The apparatus of claim 9, wherein the at least one processor is further configured to:

feed back the third soft input to the soft syndrome former.

11. The apparatus of claim 10, wherein the at least one processor is further configured to:

iteratively exchange soft information between the FEC decoder, the soft symbol demapper, and the soft syndrome former.

12. The apparatus of claim 9, wherein to process the received signal by the soft symbol demapper, the at least one processor is configured to:

compute soft metrics for the constellation symbol based on the received signal, the first soft input, and the second soft input.

13. A non-transitory computer-readable medium storing computer executable code for wireless communication of a receiver, comprising code to:

receive, from a transmitter, a signal carrying a constellation symbol;

process the received signal by a soft symbol demapper to generate, based on the same constellation symbol, a first soft output of a first set of bits corresponding to unshaped bits for selecting one of a plurality of constellation points within a quadrant of a constellation and a second soft output of a second set of bits corresponding to shaped bits for selecting the quadrant, wherein the first soft output and the second soft output comprise soft bit metrics with confidence information;

process the second soft output by a soft syndrome former to generate a third soft output of a third set of bits and a second soft input corresponding to the second soft output, wherein the soft syndrome former corresponds to a shaping code applied at the transmitter and computes the third soft output by applying a syndrome former matrix to the second soft output to recover syndrome bits from the shaped bits;

feed back the second soft input from the soft syndrome former to the soft symbol demapper, wherein the soft symbol demapper uses the second soft input as prior information for computing soft metrics for the constellation symbol; and recover bits represented by the constellation symbol based on the first soft output and the third soft output.

14. The non-transitory computer-readable medium of claim 13, further comprising code to:

process the first soft output and the third soft output by a forward error correction (FEC) decoder to generate a first soft input corresponding to the first soft output and a third soft input corresponding to the third soft output.

15. The non-transitory computer-readable medium of claim 14, further comprising code to:

feed back the first soft input to the soft symbol demapper.

16. The non-transitory computer-readable medium of claim 15, further comprising code to:

feed back the third soft input to the soft syndrome former.

* * * * *